March 11, 1947.  C. R. CRANE, 2D., ET AL  2,417,353
VALVE ACTUATING MECHANISM
Filed Jan. 22, 1944
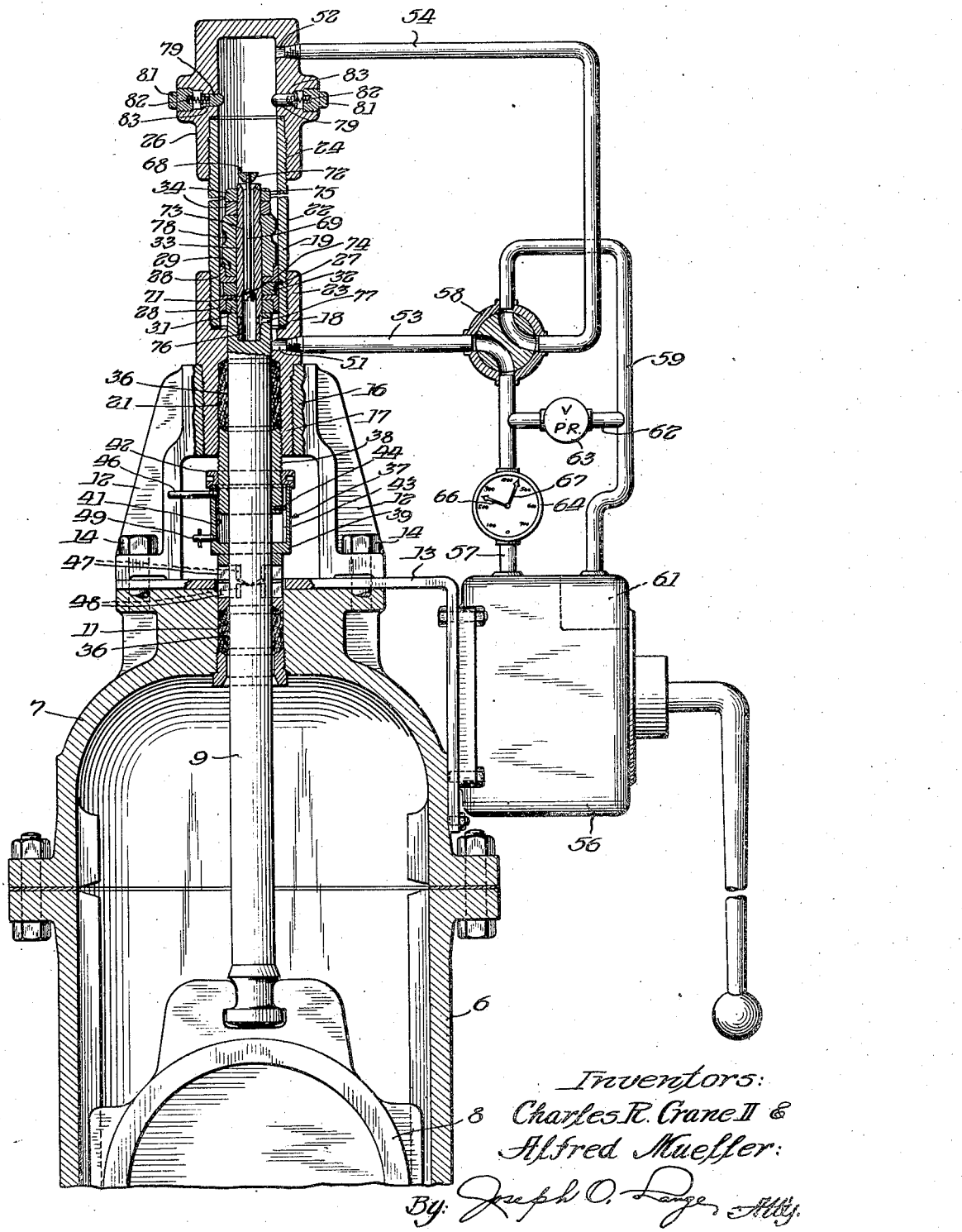
Inventors:
Charles R. Crane II &
Alfred Mueller:
By: Joseph O. Lange, Atty.

Patented Mar. 11, 1947

2,417,353

UNITED STATES PATENT OFFICE 2,417,353

VALVE ACTUATING MECHANISM

Charles R. Crane, II, Chicago, and Alfred Mueller, Berwyn, Ill., assignors to Crane Co., Chicago, Ill., a corporation of Illinois Application January 22, 1944, Serial No. 519,388

3 Claims. (Cl. 137—139)

This invention relates to a valve actuating mechanism or the like and pertains especially to hydraulically operated valves. It has for an object the provision of a valve of this type which is relatively simple in operation, economical in construction and which will not readily get out of order.

This invention further contemplates improvements in valves of this type wherein that portion of the closure stem projecting from the valve casing is entirely enclosed and protected from harmful elements.

This invention further contemplates the provision of an improved stuffing box gland having a telescopic structure arranged for engagement with packing disposed in opposing stuffing boxes. This gland is an improvement over the gland disclosed and claimed in the application filed November 29, 1943, under Serial No. 512,233.

It is a further object of this invention to provide piston means for reciprocable movement in a cylinder for operating a valve closure member, together with pressure relief valve means operable when the piston reaches a predetermined position within the cylinder to cause a pressure drop.

It is a further object of this invention to provide a hydraulically operated valve embodying improved mechanical means for holding the valve closure member in open position in the event of fluid leakage in the hydraulic system.

This invention further contemplates the provision of a hydraulic operating means which may readily be mounted for use on standard valves installed in a pipe line and without removing the body of the valve from its position in the line.

This invention embodies other novel features, details of construction and arrangement of parts which are hereinafter set forth in the specification and claims and illustrated in the accompanying drawing, forming part thereof, wherein:

The figure illustrates a vertical sectional view showing a valve embodying features of this invention, and in which the fluid control piping is shown diagrammatically.

Referring now to the drawing for a better understanding of this invention, we show a hydraulically operated valve comprising a body 6 having a bonnet 7 and a closure member 8 which may be other than the gate type shown. A stem 9 is secured at its one end to the closure member and projects upwardly through a stuffing box 11 provided in the bonnet. Yoke arms 12 and a pump support bracket 13 are secured to the bonnet by means of screws 14, and the yoke arms are formed with an internally threaded opening 16 to receive an externally threaded end portion 17 of a lower member 18 of a hydraulic cylinder 19. The lower member 18 is bored to receive the stem 9 and is provided with a stuffing box 21.

The cylinder 19 comprises a sleeve portion 22 which is externally threaded at its ends for engagement in internally threaded openings 23 and 24 provided in the lower member 18 and an upper member 26 respectively. A piston 27 is provided on the upper end of the stem 9 and comprises a pair of opposing cup members 28, the cup forming collars 29 and 31, and a spacing collar 32 positioned on a stud 33 threaded into the end of the stem and held against displacement on the stud by the upper end of the stem 9 and the nuts 34.

The stuffing boxes 11 and 21 are filled with suitable packing 36. A telescopic gland structure 37 is provided with an upper gland member 38 and a lower gland member 39 for engagement with the packing in the stuffing boxes 21 and 11, respectively, and this structure also serves to enclose and protect that portion of the stem 9 which otherwise would be exposed to the elements. The lower gland member 39 is recessed at 41 for telescopic engagement with the upper gland member 38 which is externally threaded to receive an adjustment nut 42. A longitudinally extending slot 43 is formed in the wall of the recess 41 to receive and engage the outer end of a pin 44 which is threaded into the lower end portion of the gland member 38 to permit relative axial movement of the members 38 and 39 and to prevent relative rotational movement thereof. A gland arm 46 is threaded into the gland member 39 for contact with the yoke arms 12 to prevent rotational movement of the gland structure during adjustment of the nut 42. The lower gland member 39 is preferably formed with opposing adjustment fingers 47 and 48 which may be positioned end-to-end, as shown, to provide a maximum length gland, or the fingers may be positioned side-by-side to provide a minimum length gland. If desired, protective lubricant for the stem 9 may be supplied to the recess 41 by means of the usual form of lubricant fitting 49.

Fluid entry passages 51 and 52 are formed in the cylinder members 18 and 26 respectively, leading from the conduits 53 and 54, respectively, to the interior of the cylinder. A pump 56 is mounted on the bracket 13 to supply fluid under pressure through a conduit 57 and a four-way valve 58 to the conduits 53 and 54. A fluid return conduit 59 leads from the four-way valve to a suitable reservoir preferably provided conveniently within the pump casing as at 61. A by-pass conduit 62 leads from the conduit 57 to the return flow conduit 59 and has a pressure relief valve 63 interposed therein. A pressure gage 64 is interposed in the conduit 57 and provided with two indicator arms 66 and 67, one arm being manually set to indicate the pressure required to actuate and seat the valve closure member, the other arm functioning to indicate the fluid pressure actually being applied currently to operate the valve.

Within the cylinder 19, a control valve 68 is provided, comprising a stem portion 69 having a seat portion 71 formed on one end thereof and a seat portion 72 secured to the other end, the valve being positioned for reciprocable movement in an aperture 73 formed in the stud 33. Seats 74 and 75 are formed at opposite ends of the aperture 73 for alternate engagement by the valve seat portions 71 and 72 respectively. A fluid chamber 76 is provided at the inner end of the aperture 73 to receive fluid from the cylinder through a passage 77.

A plurality of spring pressed latches are provided on the upper member 26 of the cylinder 19 to yieldingly resist engagement and disengagement with a circumferential groove 78 formed in the collar 29. Each latch comprises a reciprocably movable finger 79, a threaded plug 81 and a compression spring 82 which normally acts to hold the finger inwardly against a stop shoulder 83.

In the operation of the valve thus described, fluid under pressure may be supplied by the pump 56 or any other suitable means through the conduits 57 and 53 to raise the piston and thereby open the valve, or the fluid may be directed through the conduits 57 and 54 to lower the piston and thereby close the valve. When the piston is being raised to open the valve the fluid also enters the chamber 76 through the passage 77 and acts to move the seat portion 71 against the seat 74 to close the aperture 73 leading to the upper end of the cylinder. When the piston reaches its upper position the upper end of the control valve 68 engages the top wall of the cylinder and causes the seat portion 71 to move out of engagement with its seat 74 to thereby permit fluid to pass from the lower end of the cylinder to the upper end thereof. The latch fingers 79 engage the walls of the groove 78 when the piston is in its upper position to resist closing of the valve until fluid under pressure is applied to the piston.

Thus while this invention has been shown in but one form it is obvious to those skilled in the art that it is not so limited but is susceptible of various changes and modifications without departing from the spirit thereof or the appended claims.

We claim:

1. In a hydraulically operated valve or the like, the combination with a valve bonnet having a closure stem reciprocably mounted therein, of yoke arms mounted on said bonnet, a hydraulic cylinder mounted on said yoke arms, a piston mounted for reciprocable movement in said cylinder and connected to said closure stem, a stuffing box for packing provided at the upper end of the bonnet to receive the stem, a stuffing box for packing provided at the lower end of said cylinder to receive the stem, a telescopic gland structure enclosing the stem and disposed between said stuffing boxes for engaging the packing therein, and a plurality of adjusting means for varying the length of said gland structure, one of said adjusting means comprising a step adjustment providing a substantial overall increase or decrease in the length of the gland structure, and the other of said adjusting means comprising a threaded adjustment for providing a limited variation of the overall length of the said gland structure.

2. In a stuffing box for packing for a shaft or the like, a telescopic gland structure therefor substantially enclosing the shaft, a plurality of adjusting means for varying the length of said gland structure, one of said adjusting means comprising a step adjustment providing a substantial overall increase or decrease in the length of the gland structure, and the other of said adjusting means comprising a threaded adjustment for providing a limited variation of the overall length of the said gland structure.

3. In a stuffing box for packing and adapted to receive a stem or the like, a telescopic gland structure for engaging the packing therein, a plurality of adjusting means for varying the length of said gland structure, one of said adjusting means comprising an adjustment limitedly rotatable providing a substantial overall increase or decrease in the length of the gland structure, and the other of said adjusting means comprising an adjustment freely rotatable for providing a limited variation of the overall length of the said gland structure.

CHARLES R. CRANE, II.
ALFRED MUELLER.

REFERENCES CITED

The following references are of record in the file of this patent:

UNITED STATES PATENTS

| Number | Name | Date |
|--------|------|------|
| 1,977,554 | Hall | Oct. 16, 1934 |
| 1,828,517 | White | Oct. 20, 1931 |
| 365,400 | McHugh | June 28, 1887 |
| 265,607 | Jay | Oct. 10, 1882 |
| 2,217,686 | Kreher | Oct. 15, 1940 |
| 1,284,538 | Young | Nov. 12, 1918 |
| 1,806,305 | Mueller | May 19, 1931 |
| 1,317,668 | Shively | Sept. 30, 1919 |
| 2,010,129 | Baker | Aug. 6, 1935 |
| 2,233,521 | Ernst | Mar. 4, 1941 |
| 513,601 | Teal | Jan. 30, 1894 |
| 1,744,069 | Dapron | Jan. 21, 1939 |

FOREIGN PATENTS

| Number | Country | Date |
|--------|---------|------|
| 530,834 | French | Oct. 11, 1921 |